United States Patent [19]

Weber

[11] Patent Number: 4,946,182

[45] Date of Patent: Aug. 7, 1990

[54] MULTI-DIRECTIONAL ADJUSTABLE TOWING HITCH

[75] Inventor: Randall Weber, Elkhart, Ind.

[73] Assignee: Weber Manufacturing Company, Elkhart, Ind.

[21] Appl. No.: 297,206

[22] Filed: Jan. 17, 1989

[51] Int. Cl.⁵ ................................................ B60P 3/12
[52] U.S. Cl. .................................. 280/402; 212/261; 280/425.1; 280/490.1; 414/563
[58] Field of Search ................. 280/402, 425.1, 479.1, 280/490.1; 414/563; 212/261, 245, 254, 265

[56] References Cited

U.S. PATENT DOCUMENTS

| | | | |
|---|---|---|---|
| 3,384,253 | 5/1968 | Wood | 212/261 X |
| 3,828,941 | 8/1974 | Coutinho | 212/261 |
| 3,897,879 | 8/1975 | Bubik | 280/402 X |
| 4,679,978 | 7/1987 | Holmes et al. | 414/563 |

FOREIGN PATENT DOCUMENTS

| | | | |
|---|---|---|---|
| 88014 | 10/1969 | Denmark | 212/261 |
| 102473 | 7/1963 | Norway | 212/261 |

*Primary Examiner*—Mitchell J. Hill
*Attorney, Agent, or Firm*—Thomas J. Dodd

[57] ABSTRACT

A towing hitch which includes three or more power cylinders to effect adjustment of the hitch along a central axis in horizontal and vertical directions to accommodate road or site conditions. The hitch may also be used as a rear end jack for the towing vehicle to provide access to the rear tires.

7 Claims, 8 Drawing Sheets

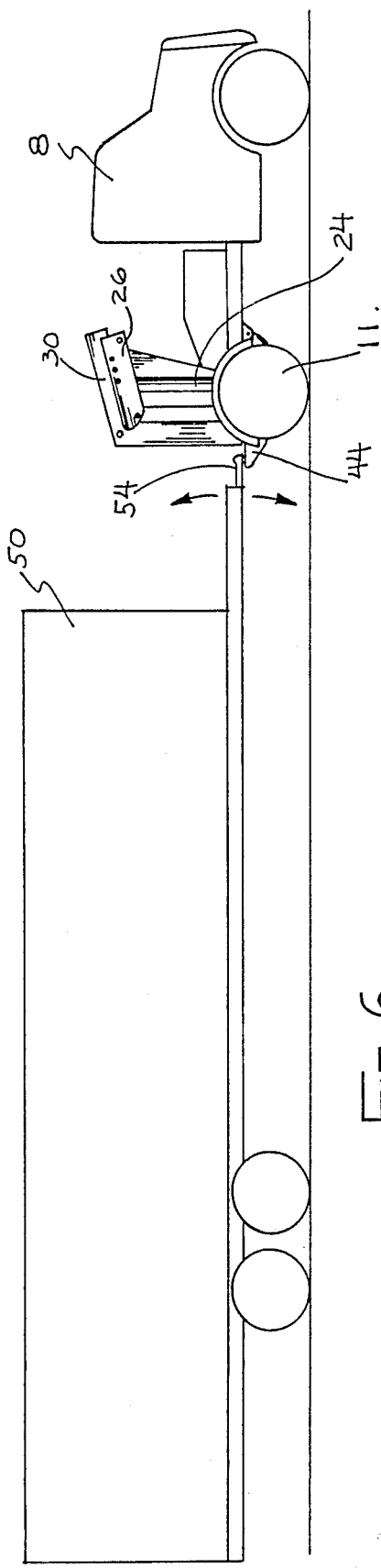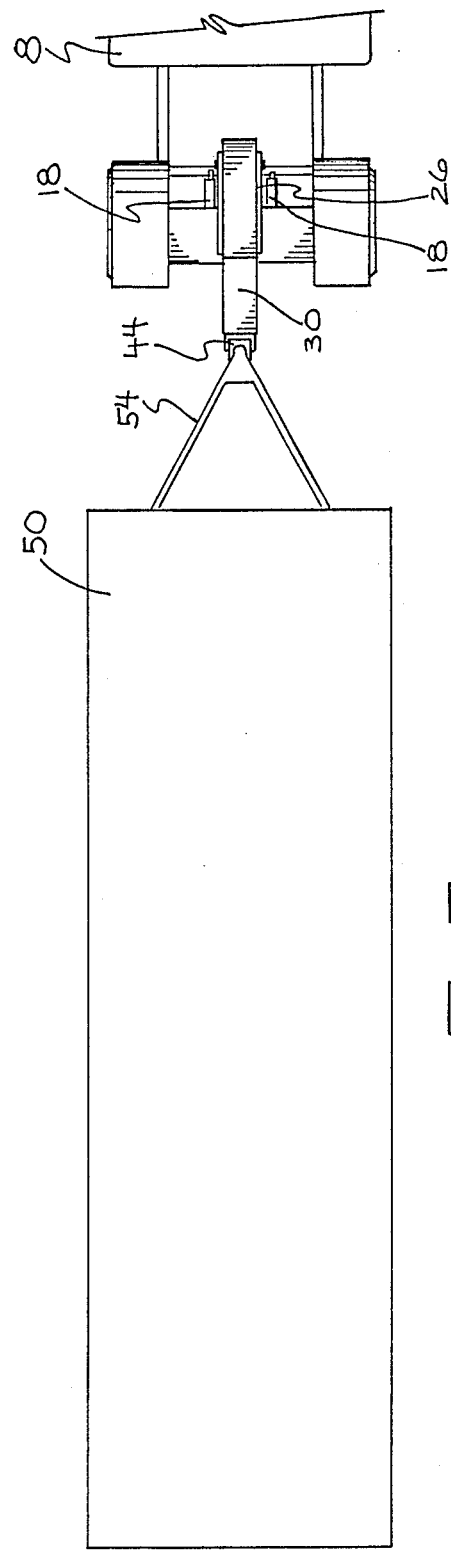
Fig. 6
Fig. 7

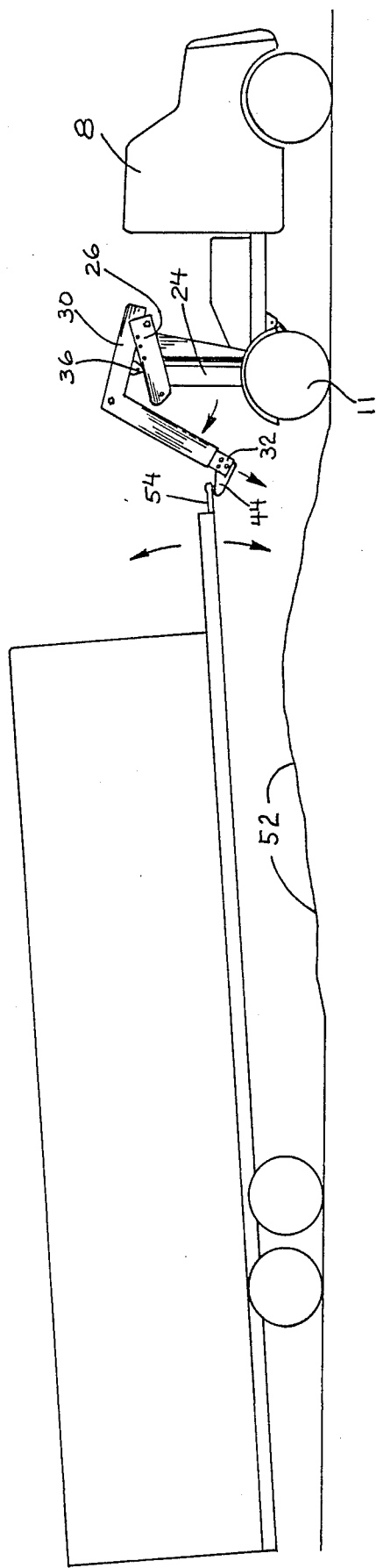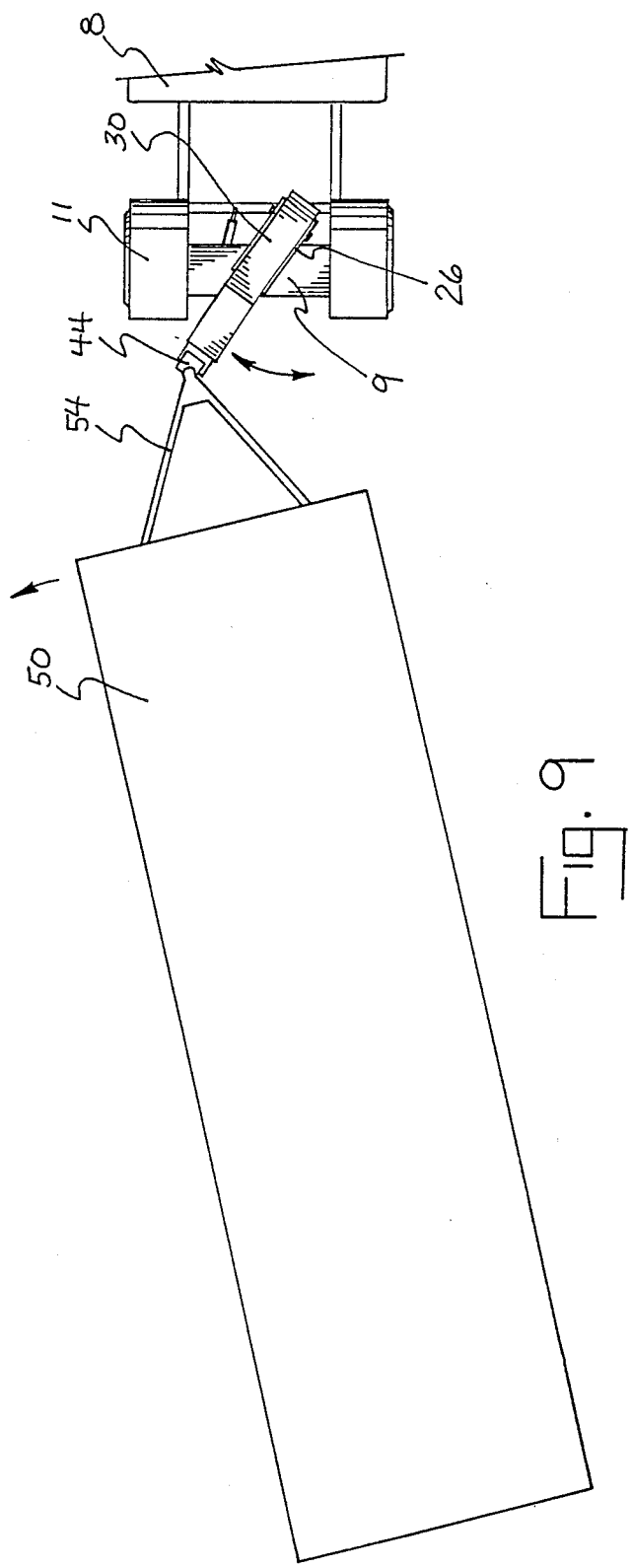

MULTI-DIRECTIONAL ADJUSTABLE TOWING HITCH

SUMMARY OF THE INVENTION

This invention relates to towing hitches and will have application to an adjustable hitch.

The towing hitch of this invention is adapted for connection to a towing vehicle such as a wrecker, fork lift or truck cab and includes a plurality of power cylinders connected to a pivotal arm arrangement. The cylinders cooperate with the arm arrangement to allow linear vertical and horizontal adjustments as well as side to side pivotal adjustments. These adjustable features allow a single hitch to be used in many fashions and provides for automatic power-assisted adjustments to adequately compensate for any problems peculiar to the vehicle being towed or the road surface being traversed.

Accordingly, it is an object of this invention to provide for a towing hitch which may be adjusted in a multiplicity of directions.

Another object is to provide a versatile adjustable towing hitch.

Another object is to provide a towing hitch which is easily adjusted by power actuated assists.

Other objects of the invention will become apparent upon a reading of the following description.

BRIEF DESCRIPTION OF THE DRAWING

A preferred embodiment of the invention has been depicted to illustrate the principles of the invention wherein:

FIG. 6 is an elevation view of the hitch shown towing a mobile home.

FIG. 7 is a top plan view of the hitch shown towing a mobile home.

FIG. 8 is an elevation view similar to FIG. 6 but showing the hitch in a raised towing position to accommodate rough road travel.

FIG. 9 is a top plan view similar to FIG. 7 but showing the hitch in a side to side adjusted position.

DESCRIPTION OF THE PREFERRED EMBODIMENT

Figure 1:
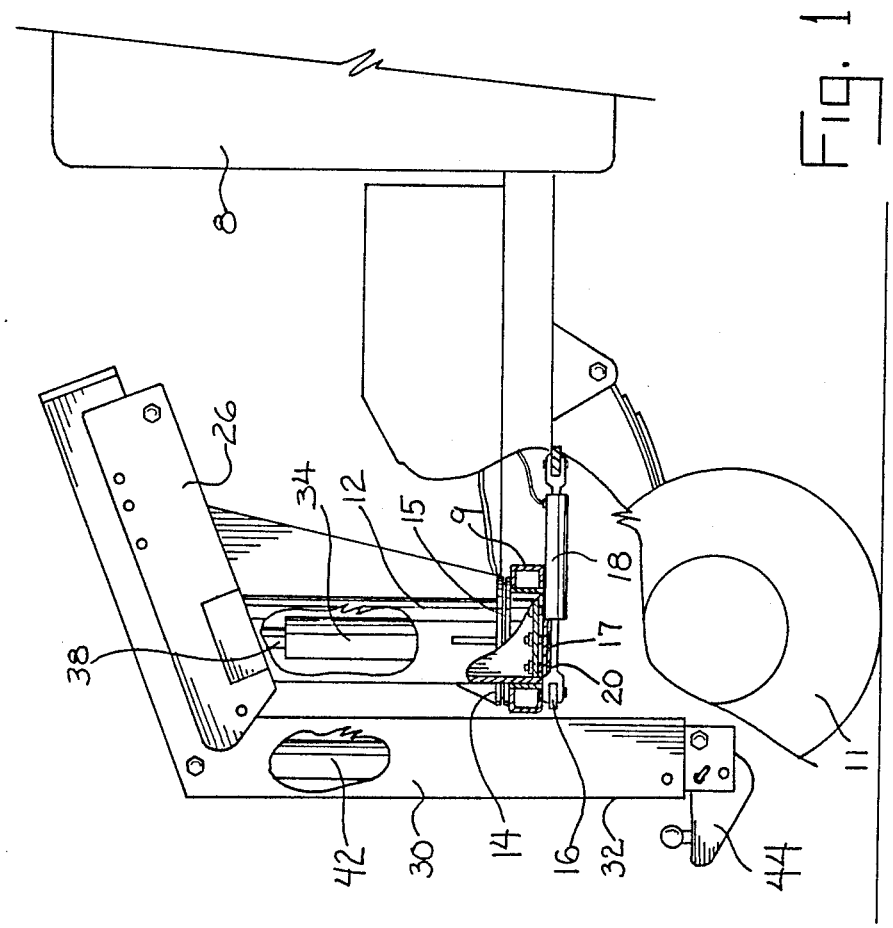
FIG. 1 is a fragmentary side elevation view of the hitch in a normal towing position with portions cut away to illustrate the power assists.

The preferred embodiment herein described is not intended to be exhaustive or to limit the invention to the precise form disclosed. It is chosen and described to explain the principles of the invention and its application and practical use so that others skilled in the art are able to utilize the invention.

Referring now to the accompanying drawings, reference numeral 10 refers generally to the towing hitch of this invention which is used in association with towing vehicle 8. Vehicle 8 may be any type of vehicle used in hauling such as a wrecker, a fork lift, or a semi tractor, to name a few. Vehicle 8 typically has a support structure, such as a frame 9, to which the hitch 10 may be connected.

Figure 3:
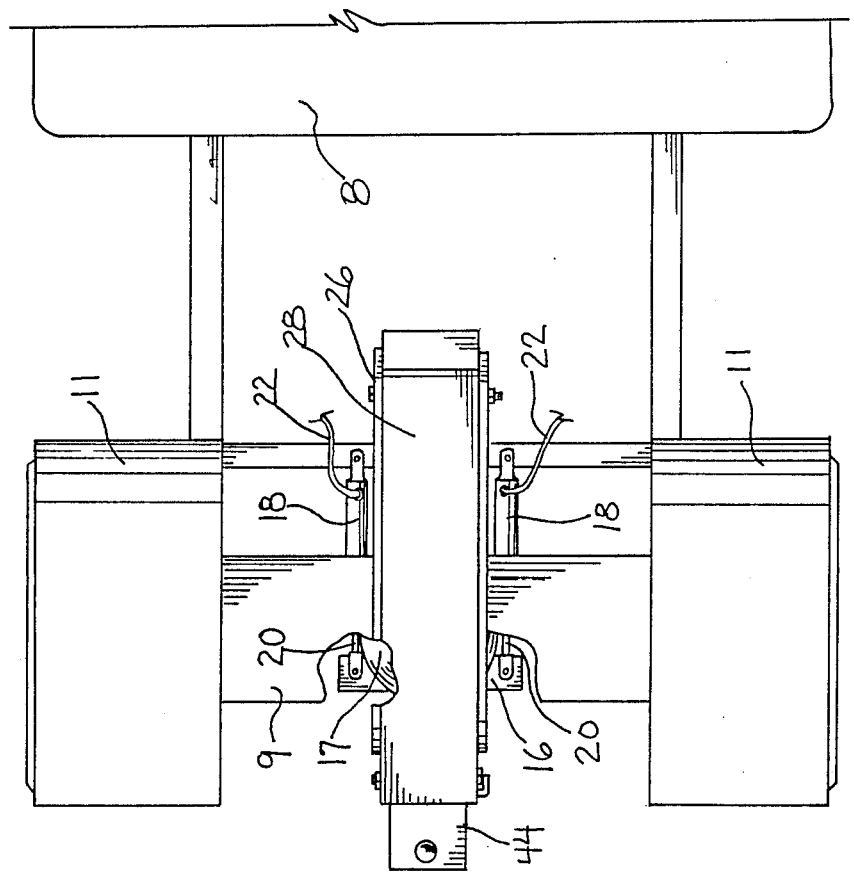
FIG. 3 is a fragmentary top plan view of the hitch in the normal towing position.

Hitch 10 includes a cylinder 12 which extends into and is rotatably connected to frame 9, such as by disks 14, 15. Disk 14 is integral with cylinder 14 while disk 15 is stationary. Lubricant may be present between disks 14, 15 to facilitate relative rotation. An actuator bar 16 is operatively connected to base 12 through disk 17 which allows for correlative rotation of the bar and the cylinder about disks 14, 15. Power driven members such as hydraulic or pneumatic cylinders 18 are connected as shown in FIGS. 1 and 3 to frame 9. Each cylinder 18 includes an extensible piston rod 20 connected to opposite ends of actuator bar 16. An air or fluid supply line 22 is connected at one end to each cylinder 18 and is connected at its other end to a source of compressed air or hydraulic fluid (not shown).

Figure 2:
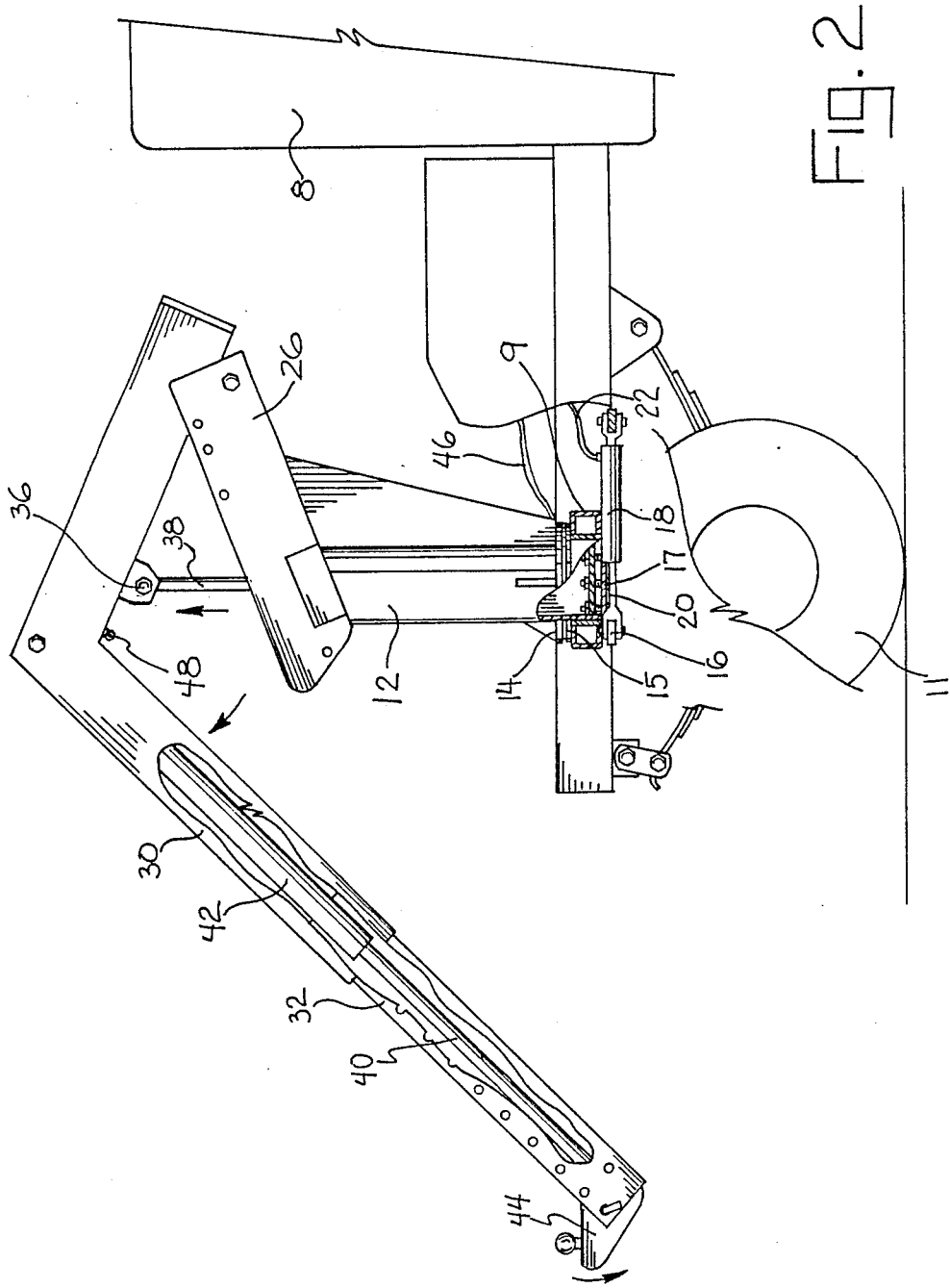
FIG. 2 is a view similar to FIG. 1 but with the hitch adjusted into a rough road towing position.

A stationary support member illustrated as U-shaped channel part 26 is fixedly attached to cylinder 12 and extends at an oblique angle therefrom. Hoist arm 28, which includes a tubular arm 30 and a tubular arm 32 telescopically received in arm 30, is operatively connected to power driven cylinder 34 by a pivot pin 36 operatively connected to cylinder rod 38. Arm 32 is connected to the piston rod 40 of cylinder 42 which is housed within arm 30 as seen in FIG. 2. A hitch ball coupler 44 is connected to the end of arm 32 as shown. Air or fluid supply lines 46 are connected between cylinder 34 and a source of compressed air or fluid (not shown), and cylinder 42 is connected to the source of air or fluids (not shown) via supply lines (not shown) which terminate at fluid inlet 48.

Figure 4:
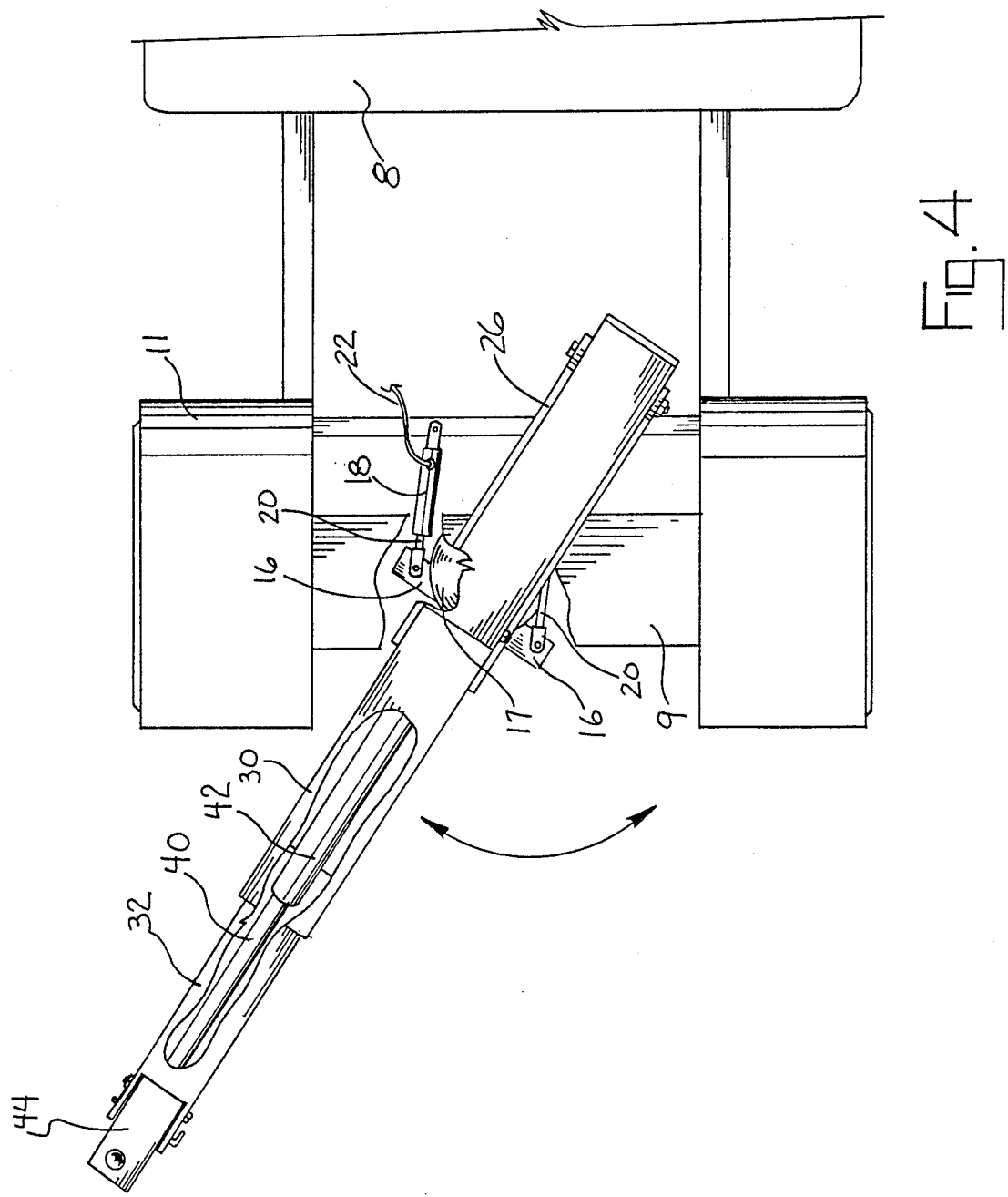
FIG. 4 is a fragmentary top plan view of the hitch in the rough road towing position and showing the side to side adjustment feature.
Figure 5:
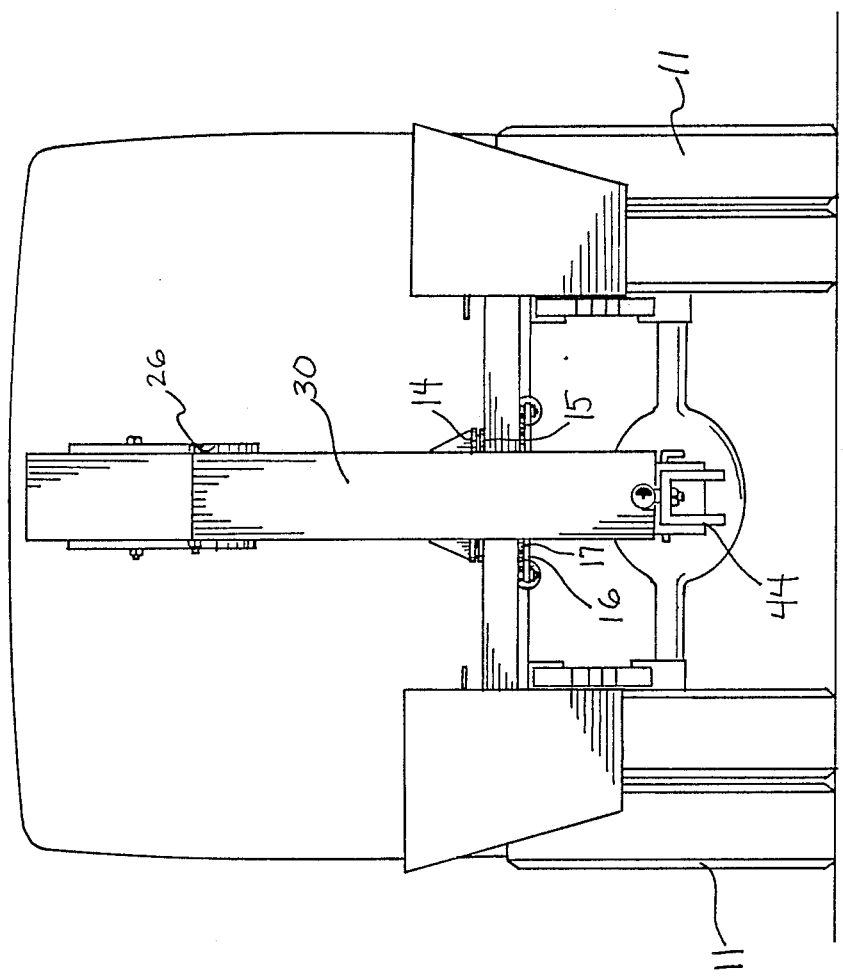
FIG. 5 is a rear elevation view of the hitch in the normal towing position.

The multidirectional adjustment of hitch 10 is illustrated in FIGS. 4 and 8-10. FIGS. 4 and 9 illustrate the rotatability of the hitch about the central axis of cylinder 12 as may be necessary when backing a mobile home or other RV 50 into a tight parking space or home site. As shown in FIG. 4, air or other fluid is introduced into one of the power driven cylinders 18 which urges its piston rod 20 outwardly to cause actuator bar 16, disk 17 and cylinder 12 to rotate about disk 15. Due to the cradled position of hoist arm 28 in channel part 26, the hoist arm and connected hitch coupler 44 also rotate to reposition RV 50 for ease in entering the desired space. To return hitch 10 to its squared position of FIG. 3, fluid supply to the one cylinder 18 is discontinued and the pressure in the cylinders 18 equalized to return the actuator bar to the squared position.

FIG. 8 illustrates hitch 10 as adjusted to accommodate uneven terrain 52. Power driven cylinder 34 has been activated to urge its piston rod 38 upwardly to raise hoist arm 28 and connected hitch coupler 44 as shown to prevent bottoming out of the hitch coupler and RV tongue 54.

Figure 10:
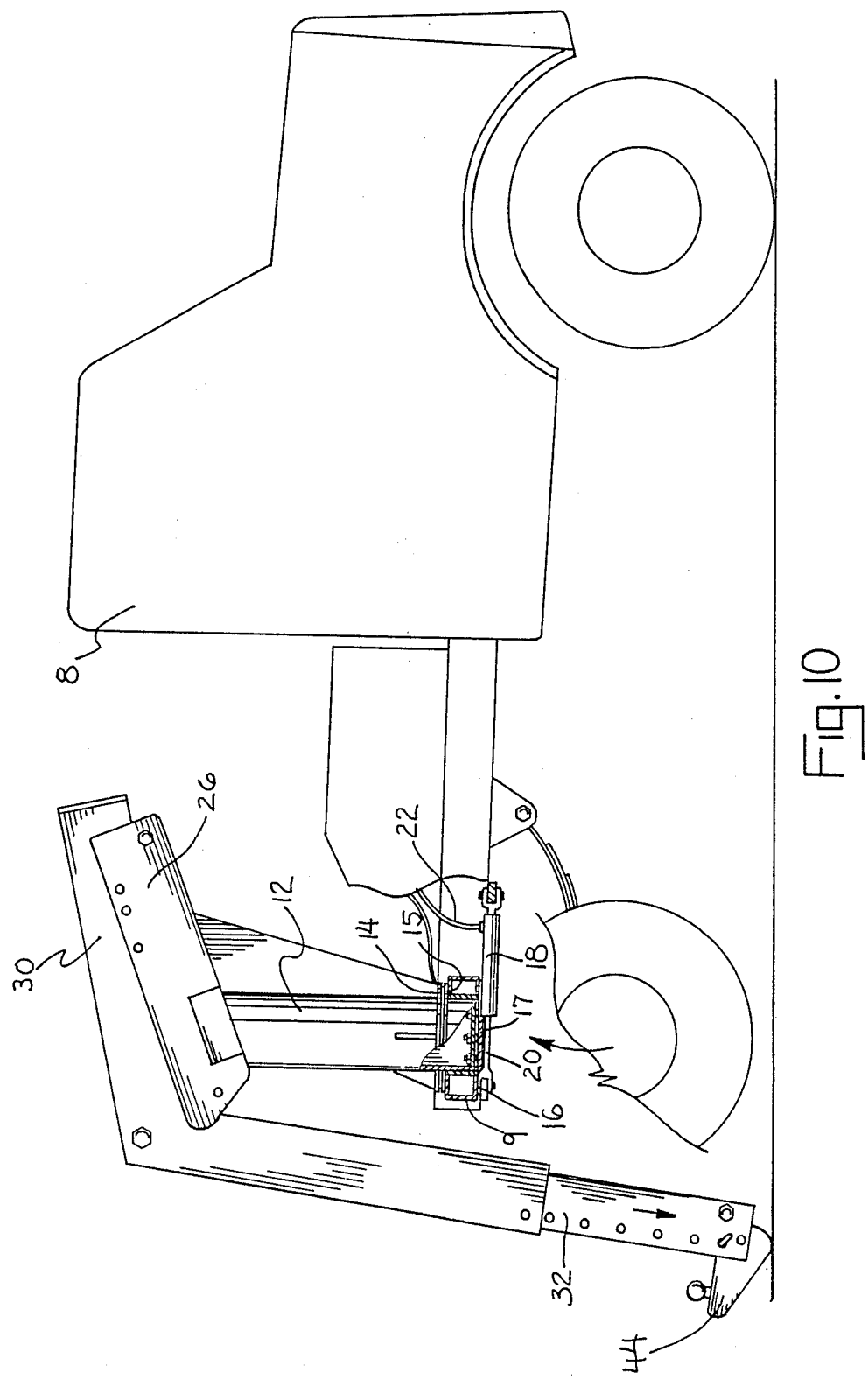
FIG. 10 is an elevation view of the hitch shown in use as a lift jack for a towing vehicle.

FIG. 10 illustrates hitch 10 being used as a jack for changing the rear tires 11 of towing vehicle 8. As shown, arm 32 has been extended outwardly of arm 30 by actuating power cylinder 42 to extend its piston rod 40. When the lower end of arm 32 (or hitch coupler 44) contacts the ground, arm 32 acts as a jack to raise the rear end of vehicle 8 off the ground and provide access to tires 11.

It is understood that the above description does not limit the invention to those details which may be modified within the scope of the following claims.

I claim:

1. A towing hitch adapted for connection to a towing vehicle, said hitch comprising an upright cylinder rotatably mounted to a supporting surface and defining an axis, first power driven means connected to opposite sides of said cylinder for effecting rotational movement of the cylinder about said axis relative to the supporting surface, a support member connected to said cylinder, a hoist arm pivotally connected at one end thereof to an end of said support member, second power driven means extending through said cylinder along said axis and connected to said hoist arm for raising and lowering the hoist arm relative to said supporting surface, said hoist arm terminating at an end opposite its said one end in a hitch coupler means for connecting the hoist arm to a vehicle to be towed.

2. The towing hitch of claim 1 wherein said hoist arm includes a first tubular arm and a second tubular arm telescopically received in the first tubular arm, said first tubular arm pivotally coupled to said support member, said second tubular arm including said hitch coupler means, and third power driven means connected between said first and second tubular arms for sliding said second tubular arm longitudinally relative to the first tubular arm.

3. The towing hitch of claim 2 wherein said first, second and third power driven means are hydraulic cylinders.

4. The towing hitch of claim 2 wherein said supporting surface is a towing vehicle frame.

5. The towing hitch of claim 2 wherein said first tubular arm includes a first portion and an integral second portion, said arm second portion oriented generally perpendicular to the ground, said second tubular arm slidably carried in said first tubular arm second portion.

6. The towing hitch of claim 5 wherein said second tubular arm is extendable so as to contact ground wherein said towing hitch may be utilized as a rear wheel jack means for lifting a rear end of the vehicle above said ground.

7. The towing hitch of claim 1 wherein said first power driven means includes a bar connected to and extending laterally from adjacent a bottom edge of said cylinder at said opposite sides, first and second power driven cylinders each connected to an opposite end of said bar, said first and second power driven cylinders actuable separately of each other, to selectively shift said bar and rotate said cylinder.

* * * * *